Patented Dec. 15, 1953

2,662,854

UNITED STATES PATENT OFFICE 2,662,854

PHOTOCHEMICAL PREPARATION OF 17,20-HYDROXY-KETONES OF THE PREGNANE SERIES

Karl Miescher, Riehen, and Julius Schmidlin, Basel, Switzerland, assignors to Ciba Pharmaceutical Products, Inc., Summit, N. J.

No Drawing. Application September 21, 1951, Serial No. 247,766

Claims priority, application Switzerland October 12, 1950

5 Claims. (Cl. 204—158)

This invention relates to the preparation of saturated or unsaturated 17,20-hydroxy-ketones of the pregnane series having a free, esterified or etherified hydroxyl group in 21-position.

Such hydroxy-ketones of the pregnane series are of very great importance. Thus, for example, cortisone — $\Delta^4$-3,11,20-triketo-17$\alpha$,21-dihydroxy-pregnene—and substance S—$\Delta^4$ - 3,20 - diketo-17$\alpha$,21-dihydroxy-pregnene—are 17,20-hydroxyketones. Various processes for the preparation of these compounds are known. Thus, they may be produced by treatment of the corresponding $\Delta^{17,20}$-21-acetoxy-pregnene compounds with hydroxylating agents, such as osmium tetroxide, and subsequent partial oxidation of the thus-obtained 17,20,21-triols. This process requires at least three stages for the production of the desired 17,20-hydroxy-ketones. The yields are very unsatisfactory, especially in the last stage.

A primary object of the present invention is the embodiment of a process which is free of the deficiency of the known processes, and wherein, more particularly, the number of stages is materially reduced and the resultant yield materially increased.

This object is realized by the process of the present invention, according to which, briefly stated, a 17,20-hydroxy-ketone is obtained directly by reacting a pregnene compound with the grouping =CH—CH$_2$X in 17-position, in which X indicates a free, esterified or etherified hydroxyl group with a metal oxide which is capable of adding onto carbon-carbon double bonds and with a peroxide compound, the reactants being exposed to light during the reaction, and the formed 17,20-hydroxy-ketone being thereafter isolated from the reaction mixture. The process according to the present invention gives essentially better yields than the known processes and, moreover, comprises only one reaction stage.

As starting materials for the process according to this invention, there are used, more particularly, esterified or etherified 21-hydroxy-pregnene compounds, for example such as contain in 21-position an acyloxy group, for example the acetoxy, propionyloxy, succinyloxy, benzoyloxy or tosyloxy group, or a halogen atom or an alkoxy group, for example the methoxy or ethoxy group, or a hydroxyl group etherified with a sugar residue, such as d-glucose, galactose, maltose or lactose. The starting materials can in addition be also substituted in 5-, 6-, 7-, 12- and especially in 3- and 11-position, for example by free or functionally converted keto or hydroxyl groups, as by acyloxy groups, for example the acetoxy, propionyloxy, benzoyloxy or tosyloxy group, or halogen atoms, by alkoxy groups, such as the methoxy or ethoxy group, or by epoxy groups for example in 3,9-position. They may further also contain double bonds in 3-, 4-, 5-, 9- and/or 11-position. If necessary such double bonds are temporarily protected in the manner known per se, for example by saturation with halogen or hydrogen halide or by conversion into pentacyclic isosteroids.

The aforementioned metal oxides are especially those of the highest valency stages of heavy metals of the groups 5 to 8 of the periodic system; for example, osmium tetroxide, further also tungsten trioxide. The preferred peroxide compound is hydrogen peroxide. Other organic peroxide compounds are also suitable such for example as alkyl peroxides or peracids, for example, performic, peracetic, perpropionic, perbutyric, perbenzoic and monoperphthalic acid. The reaction is advantageously carried out in an anhydrous or aqueous diluent. Especially suitable are tertiary carbinols, for example tertiary butanol, and also ethers, lower fatty acid esters and chlorinated hydrocarbons, such as methylene chloride or carbon tetrachloride. For the irradiation by light, various light sources can be used with or without an ultra-violet constituent, as for example the light of electric incandescent lamps, quartz lamps, arc lamps or also strong natural light such as direct sunlight.

In copending application Ser. No. 209,516, filed February 5, 1951, there is described a process for the preparation of a 17,20-hydroxyketone which comprises reacting a pregnene having the grouping =CH—CH$_2$X in 17-position, X representing a member selected from the group consisting of free, esterified or etherified hydroxyl, with osmium tetroxide and with a member selected from the group consisting of hydrogen peroxide, an alkyl peroxide, and a peracid, and isolating the resultant hydroxyketone from the reaction mixture. The irradiation by light according to the present invention offers principally the advantage of increasing considerably the velocity of reaction. In addition, secondary reactions are excluded to a far-reaching extent.

The products of manufacture may be used as medicaments or as intermediates. Some of them are new. Thus, $\Delta^4$-3,20-diketo-17$\alpha$-hydroxy-21-halogen-pregnenes, for example $\Delta^4$-3,11,20-triketo-17$\alpha$-hydroxy-21-bromo-pregnene or $\Delta^4$-3,20-diketo-17$\alpha$-hydroxy-21-bromo-pregnene, are new compounds which are of great importance as intermediates in the manufacture of therapeutically active substances.

The following examples illustrate the invention, parts and percentages being by weight unless otherwise indicated, and the relation between parts by weight and parts by volume being the same as that between the kilogram and the liter:

*Example 1*

3.565 parts by weight of $\Delta^{4:17,20}$-3-keto-21-acetoxy-pregnadiene are dissolved in 50 parts by volume of tertiary butanol and treated with 13.5 parts by volume of a 1.5-molar solution of hydrogen peroxide in tertiary butanol. While exposing the resultant mixture to light from an electric lamp and continuously stirring, there are added, within 5 minutes, 10 parts by volume of a solution of 0.255 part by weight of osmium tetroxide in 25 parts by volume of tertiary butanol, the remainder being added in portions of one part by volume each at intervals of 2 hours. After exposure to light for a further 16 hours with stirring, a solution of 1.5 parts by weight of 85 per cent. sodium sulphite in 200 parts by volume of 50 per cent. aqueous methanol is added and the mixture is shaken for 24 hours at room temperature. The organic solvents are then distilled off with the simultaneous addition of 100 parts by volume of water and the reaction product is taken up in methylene chloride, the combined methylene chloride solutions washed several times with water, dried with sodium sulphate and evaporated.

The residue is dissolved in 12.5 parts by volume of anhydrous pyridine, 7.5 parts by volume of acetic anhydride added and the mixture, from which after only a few minutes crystals begin to separate, allowed to stand for 16 hours at 20° C. The easily volatile substances are then distilled off under reduced pressure, with the aid of a water pump, at 40–50° C. bath temperature and the residue stirred with 5 parts by volume of ether. After standing for several hours, the brown-colored mother liquor is filtered with suction and the crystals washed with a little ether. By recrystallizing once from acetone, the $\Delta^4$-3,20-diketo-17$\alpha$-hydroxy-21-acetoxy-pregnene of the formula

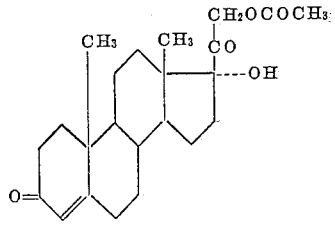

is obtained in the form of colorless prisms which melt at 236–238° C. and have a specific rotation $[\alpha]_D^{24}=+120°\pm4°$ ($c=0.532$ in acetone).

By carrying out the oxidation procedure described in this example with a $\Delta^{4:17}$-3-keto-pregnadiene substituted in the 21-position by propionyloxy, succinyloxy or benzoyloxy, the 21-propionyloxy-, 21-succinyloxy-, or 21-benzoyloxy-$\Delta^4$-3,20-diketo-17$\alpha$-hydroxy-pregnene, respectively, is obtained.

*Example 2*

3.565 parts by weight of $\Delta^{4:17,20}$-3-keto-21-acetoxy-pregnadiene are dissolved in 150 parts by volume of anhydrous ether and treated with 21.6 parts by volume of a 1.85-molar ethereal hydrogen peroxide solution, which corresponds to a doubled molecular proportion of hydrogen peroxide compared with Example 1. With exposure to light from an electric lamp and continuous stirring, there are added, within 5 minutes, a first quantity of 5 parts by volume of a solution of 0.255 part by weight of osmium tetroxide in 25 parts by volume of anhydrous ether, the remainder being added in portions of 1 part by volume each at intervals of 2 hours. When the addition is complete the whole is stirred for a further 24 hours with exposure to light.

The working up takes place in a corresponding manner to that described in Example 1. From the first crystal fraction there is isolated, by a single recrystallization from acetone, pure $\Delta^4$-3,20-diketo-17$\alpha$-hydroxy-21-acetoxy-pregnene which has a melting point of 236–238° C. and specific rotation $[\alpha]_D^{23}=+120°\pm4°$ ($c=0.531$ in acetone).

*Example 3*

3.775 parts by weight of finely powdered $\Delta^{4:17,20}$-3-keto-21-bromo-pregnadiene are covered with 50 parts by volume of tertiary butanol, treated with 13.5 parts by volume of a 1.5-molar solution of hydrogen peroxide in tertiary butanol and subjected to the addition, while exposing to light from an electric lamp and continuously stirring, within 32 hours of a solution of 0.255 part by weight of osmium tetroxide in 25 parts by volume of tertiary butanol. When the addition is complete the mixture is stirred for a further 48 hours with exposure to light. The tertiary butanol is then distilled off under reduced pressure, while allowing 100 parts by volume of water to flow in, and the reaction product is taken up in methylene chloride. The methylene chloride solution is washed with water, dried with sodium sulphate and evaporated. From a very concentrated solution of the residue in ether, on standing, the $\Delta^4$-3,20-diketo-17$\alpha$-hydroxy-21-bromo-pregnene of the formula

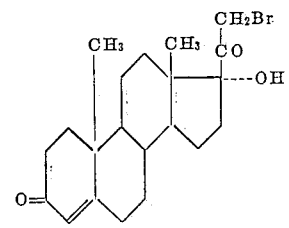

crystallizes out in fine granular form. By recrystallization from acetone with decolorization with active carbon, the pure bromoketol is obtained in the form of colorless grains which melt at 187–189° C. with decomposition.

$[\alpha]_D^{24}=+129°\pm4°$ ($c=1.010$ in dioxane)

In an analogous manner $\Delta^{4:17}$-3-keto-21-chloropregnadiene may be oxidized to form $\Delta^4$-3,20-diketo-17$\alpha$-hydroxy-21-chloro-pregnene. Analogous compounds may also be used, which carry in 11 or 12-position a substituent, such as a keto group. In this manner, $\Delta^{4;3,11;20}$-triketo-17$\alpha$-hydroxy-21-bromo-pregnene may be obtained.

1.05 parts by weight of $\Delta^4$-3,20-diketo-17$\alpha$-hydroxy-21-bromo-pregnene and 9.82 parts by weight of finely powdered anhydrous potassium acetate are covered with 150 parts by volume of dry acetone and the mixture boiled for one hour. The solvent is thereupon evaporated in vacuum and the residue, after the addition of water, extracted with ether. The ether extracts are washed with 2 per cent. sodium bicarbonate solution and water, dried with sodium sulphate and the ether distilled off. From the crude product there is obtained by recrystallization from acetone the $\Delta^4$ - 3,20 - diketo-17α-hydroxy-21-acetoxy-pregnene melting at 236–238° C. Described in Examples 1 and 2.

Example 4

7.15 parts by weight of $\Delta^{4:17}$-3-keto-21-acetoxy-pregnadiene are dissolved in 300 parts by volume of ether, treated with 29.5 parts by volume of a 1.7-molar ethereal solution of hydrogen peroxide and a solution of 0.51 part by weight of osmium tetroxide in 100 parts by volume of ether slowly introduced drop by drop with stirring, while exposing to strong light.

After a reaction period of 20 hours the whole is diluted with ether, the solution extracted by shaking several times with water for removal of excess of hydrogen peroxide, dried with sodium sulphate, filtered and evaporated.

The residue is dissolved in 250 parts by volume of methanol, treated with a solution of 3 parts by weight of sodium sulphite in 50 parts by volume of water and the whole boiled for one hour under reflux. The reaction product is extracted from the cooled mixture with much ether and the ether solution washed several times with water and dried with sodium sulphate, filtered and the solvent distilled off.

For reacetylation of the crude product which has become partially saponified in 21-position, the residue is dissolved in 50 parts by volume of anhydrous pyridine and mixed with 30 parts by volume of acetic anhydride. After 16 hours' standing at 20–25° C. the liquid is completely evaporated in vacuum at a bath temperature of 25–40° C. From the reaction product by recrystallisation with ether crude $\Delta^4$-3,20-diketo-17α-hydroxy - 21 - acetoxy-pregnene is obtained, which after a single recrystallization from acetone-ether melts at 236–238° C.

$[\alpha]_D^{25} = +121° \pm 4°$ ($c = 0.532$ in acetone)

From the mother liquor there is obtained by adsorption on aluminium oxide a further quantity of pure $\Delta^4$-3,20-diketo-17α-hydroxy-21-acetoxy-pregnene.

Example 5

3.725 parts by weight of $\Delta^{17}$-3,11-diketo-21-acetoxy-pregnene are dissolved in 150 parts by volume of 0.2-molar hydrogen peroxide in tertiary butanol. To the solution is added within 32 hours with stirring and exposing to the light of electric lamps a solution of 0.255 part by weight of osmium tetroxide in 25 parts by volume of tertiary butanol. From the time when the addition is complete stirring is continued for a further 24 hours at 25–30° C. The reaction mixture diluted with 150 parts by volume of methylene chloride is thereupon shaken for 24 hours with a solution of 3 parts by weight of 85 per cent. sodium sulphite in 75 parts by volume of water, afterwards diluted with water and then extracted several times with methylene chloride. The methylene chloride solutions are thoroughly washed with water, dried with sodium sulphate and evaporated.

For re-acetylation of the reaction product which has become partly hydrolyzed in 21-position, the residue is dissolved in 12.5 parts by volume of anhydrous pyridine and mixed with 7.5 parts by volume of acetic anhydride. After 16 hours standing at room temperature the reaction mixture is evaporated in vacuum, the residue taken up in methylene chloride and the solution washed consecutively with N-hydrochloric acid, 0.5N-sodium bicarbonate solution and water. After drying with sodium sulphate the methylene chloride is distilled off and the residue chromatographed over aluminium oxide. A portion of the oxidation product is eluated by simply using benzene and mixtures of benzene and ether. From the portions dissolved out with pure ether and mixtures of ether and acetone there is obtained by recrystallization from acetone-ether pure 3,11,20-triketo - 17α - hydroxy-21-acetoxy-pregnane of the formula

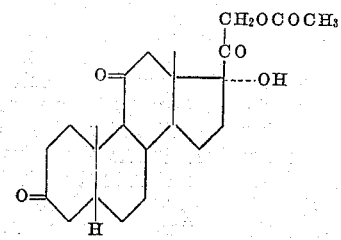

in colourless crystals of M. P. 232–234° C. (with discoloration) and of specific rotation $[\alpha]_D^{25} = +89° \pm 4°$ ($c = 0.518$ in acetone)

The specified process may also be carried out with a $\Delta^{4:17}$-3-keto-pregnadiene carrying an etherified hydroxy group in 21-position. Thus, as a result of the oxidation of $\Delta^{4:17}$-3-keto-21-methoxy - pregnadiene and $\Delta^{4:17}$ - 3 - keto-21-benzyloxy - pregnadiene, $\Delta^4$-3,20-diketo-17α-hydroxy-21-methoxy-pregnene and $\Delta^4$-3,20-diketo-17α-hydroxy - 21 - benzyloxy-pregnene are obtained.

Example 6

3.145 parts by weight of $\Delta^{4:17}$-3-keto-21-hydroxy-pregnadiene are dissolved in 50 parts by volume of tertiary butanol and treated with 12.1 parts of volume of a 1.66-molar solution of hydrogen peroxide in tertiary butanol. While exposing the resultant mixture to the light of quartz lamps and with continuous stirring there are added within 3 minutes 10 parts by volume of a solution of 0.255 part by weight of osmium tetroxide in 25 parts by volume of tertiary butanol, the remainder being added in the course of 30 hours. For completion of the reaction the mixture is subsequently stirred and exposed to light for a further 14 hours. Dilution is then effected with 250 parts by volume of methanol followed by treatment with a solution of 3 parts by weight of 85 per cent. sodium sulphite in 65 parts by volume of water and boiling for 30 minutes under reflux. After cooling to 30–40° C. the organic solvents are distilled off in vacuum while 250 parts by volume of water are allowed to flow in and the reaction product is taken up in methylene chloride. The methylene chloride solution is washed several times with water, dried with sodium sulphate and evaporated.

The $\Delta^4$-3,20-diketo-17α,21-dioxy-pregnene obtained is acetylated as described in Example 1 and further worked up. By recrystallization first from a little acetone and then from acetone-ether pure $\Delta^4$-3,20-diketo-17α-hydroxy-21-acetoxy-pregnene is obtained of M. P. 236–238° C. and specific rotation $[\alpha]_D^{21} = +123° \pm 4°$ ($c = 0.522$ in acetone).

Example 7

0.128 part by weight of osmium tetroxide is added to a solution of 1.783 parts by weight of $\Delta^{4:17}$-3-keto-21-acetoxy-pregnadiene in 60 parts by volume of ether. While stirring, and exposing to a strong light, 46 parts by volume of a 0.217-molar solution of mono-perphthalic acid in ether are allowed to flow in in the course of 6 hours. When the addition is complete, stirring and exposing to light is continued for 16 hours, then the reaction mixture is diluted with 100 parts by volume of methanol and shaken for 12 hours with a solution of 1.5 parts by weight of sodium sulphite of 85 per cent. strength in 100 parts by volume of water. The organic solvents are removed in vacuo, the oxidation product is taken up in 500 parts by volume of ether and the ether solutions are washed consecutively with an acidified 0.5-molar solution of potassium iodide, water, a 0.5-molar solution of sodium-thiosulphate, a 0.5-colar sodium-carbonate solution and water. The combined ether solutions are dried with sodium sulphate, filtered and evaporated. The residue is dissolved in 7.5 parts by volume of anhydrous pyridine and mixed with 4.5 parts by volume of acetic anhydride. After 14 hours' standing with the exclusion of moisture, the whole is evaporated at 45° C. under a water-jet vacuum and the acetylation product which is in part crystalline is stirred with ether. After filtering with suction and recrystallization from acetone the $\Delta^4$-3,20-diketo-17$\alpha$-hydroxy-21-acetoxy-pregnene is obtained in colourless prisms of M. P. 236–238° C.

Instead of monoperphthalic acid, perbenzoic acid may also be used in this example.

Example 8

A solution of 7.13 parts by weight of $\Delta^{4:17}$-3-keto-21-acetoxy-pregnadiene in 50 parts by volume of tertiary butanol is treated with 20.5 parts by volume of a 1.95-molar solution of tertiary butyl hydroperoxide in tertiary butanol. While stirring and exposing to the light of electric lamps, a solution of 0.51 part by weight of osmium tetroxide in 25 parts by volume of tertiary butanol is added within 10 hours. Stirring and exposing to light is continued for another 24 hours whereupon the reaction mixture is carefully diluted with 30 parts by volume of water. The separated crystals are washed with 75% aqueous tertiary butanol in a suction-filter apparatus. From the dried crude product, there is obtained, after a single recrystallization from acetone and decoloration by means of activated charcoal, the $\Delta^4$-3,20-diketo-17$\alpha$-hydroxy-21-acetoxy-pregnene in colourless prisms of M. P. 236–238° C.

Example 9

A solution of 2.015 parts by weight of $\Delta^{17}$-3$\beta$,21-diacetoxy-allopregnene in 100 parts by volume of tertiary butanol is mixed with 10.2 parts by volume of a 1.47-molar solution of hydrogen peroxide in tertiary butanol. While exposing to the light of strong incandescent lamps and stirring, a solution of 0.123 part by weight of osmium tetroxide in 25 parts by volume of tertiary butanol is added within 5 hours. Stirring and exposing to light is continued for another 20 hours to complete the reaction. The reaction mixture is then diluted with 100 parts by volume of methanol and shaken for 16 hours with a solution of 1.5 parts by weight of sodium sulphite of 85 per cent. strength in 100 parts by volume of water. The organic solvents are thereupon completely distilled off while allowing 75 parts by volume of water to flow in and the oxidation product is taken up in ether. The ether solutions are consecutively washed with water, 2% of sodium hydrogen carbonate solution and water, dried and evaporated.

The residue is dissolved in 12.5 parts by volume of anhydrous pyridine and mixed with 7.5 parts by volume of acetic anhydride. The solution is allowed to stand for 16 hours with the exclusion of moisture. The crude acetylation product isolated by conventional means is chromatographed in a benzene solution over 50 parts by weight of aluminium oxide. After the removal of easily separable portions with benzene, there is obtained by elutriation with ether and subsequent recrystallization from a mixture of benzene and methanol the 3$\beta$,21 - diacetoxy - 17$\alpha$ - hydroxy-20-keto-allopregnane (diacetate of Reichstein's substance P) of the formula

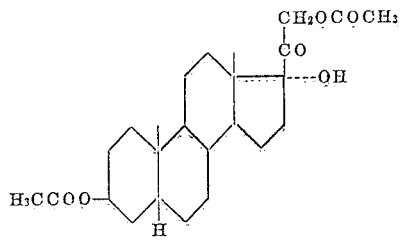

in colourless needles of M. P. 206–208° C. and of specific rotation $[\alpha]_D^{21} = +46° \pm 4° (c=0.928$ in cholorform$)$ In an analogous manner, there are obtained by starting from other $\Delta^{17}$-3$\beta$,21-diacyloxy-allopregnenes the corresponding 3$\beta$,21-diacyloxy-17$\alpha$-hydroxy-20-keto-allopregnanes, such as, for example, 3$\beta$,21-dipropionyloxy-17$\alpha$-hydroxy-20-keto-allopregnane from $\Delta^{17}$-3$\beta$,21-dipropionylhydroxy - allopregnene. Alternatively, $\Delta^{17}$ - 21-acyloxy-pregnenes carrying a free hydroxy group in 3-position may also be employed in the process.

Example 10

15 parts by volume of a 0.135-molar solution of hydrogen peroxide in tertiary butanol are poured on 0.372 part by weight of $\Delta^{4:17}$-3-keto-11$\beta$-hydroxy-21-acetoxy-pregnadiene. Upon occasional agitation and exposing to the light of strong neon lamps within 6 hours, a solution of 0.026 part by weight of osmium tetroxide in 4 parts by volume of tertiary butanol is added. After a further 32 hours' standing, and exposing to light the reaction mixture is diluted with 20 parts by volume of methanol, mixed with a solution of 0.3 part by weight of sodium sulphite of 85 per cent. strength in 20 parts by volume of water and shaken for 16 hours. The organic solvents are then distilled off in vacuo at 40° C., the oxidation product is taken up in methylene chloride, the methylene chloride solutions are consecutively washed with water, 2% sodium hydrogen carbonate solution and water, dried with sodium sulphate and evaporated.

The residue is dissolved in 10 parts by volume of anhydrous methylene chloride, treated with 2.5 parts by volume of dry pyridine, the solution cooled in ice water and mixed with 1.5 parts by volume of acetic anhydride. After 16 hours' standing at 0° C., it is shaken with ice and dilute hydrochloric acid, diluted with a further quantity of methylene chloride, thoroughly washed with water and then with 2% sodium hydrogen carbonate solution and water, dried and evaporated. The crude acetylation product is dissolved in benzene and chromatographed over 10 parts by weight of Florida bleaching earth.

As eluating agents, mixtures of benzene and ether, ether and chloroform, and chloroform and methanol are used. The fractions, melting between 205 and 218° C. and capable of considerably reducing silver diammine solution, are united and again purified by adsorption to Florida bleaching earth. The oxidation product which is thus freed from slightly reducing accompanying substances is recrystallized from a mixture of ethyl acetate and ether and from acetone whereby the $\Delta^4$-3,20-diketo-11$\beta$,17$\alpha$-dihydroxy-21-acetoxy-pregnene (acetate of Reichstein's substance M) of the formula

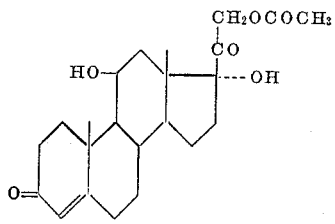

is obtained in colourless prisms of M. P. 220–222° C. and of specific rotation $$[\alpha]_D^{22} = +148° \pm 4° (c = 0.434 \text{ in acetone})$$

What is claimed is:

1. A process for the preparation of a 17,20-hydroxy-ketone of the pregnane series, which comprises reacting a pregnene having the grouping =CH—CH$_2$X in the 17-position, X representing a member selected from the group consisting of free, esterified and etherified hydroxyl, with osmium tetroxide and with a member selected from the group consisting of hydrogen peroxide, an alkyl peroxide and a peracid, the reactants being exposed to light during the reaction, and isolating the resultant 17,20-hydroxy-ketone from the reaction mixture.

2. A process for the preparation of a 17,20-hydroxy-ketone of the pregnane series, which comprises reacting a $\Delta^4$-3-keto-pregnene having the grouping =CH—CH$_2$X in the 17-position, X representing a member selected from the group consisting of free, esterified and etherified hydroxyl, with osmium tetroxide and with a member selected from the group consisting of hydrogen peroxide, an alkyl peroxide and a peracid, the reactants being exposed to light during the reaction, and isolating the resultant 17,20-hydroxy-ketone from the reaction mixture.

3. A process for the preparation of a 17,20-hydroxy-ketone of the pregnane series, which comprises reacting a 3-acyloxy-pregnene having the grouping =CH—CH$_2$X in the 17-position, X representing a member selected from the group consisting of free, esterified and etherified hydroxyl, with osmium tetroxide and with a member selected from the group consisting of hydrogen peroxide, an alkyl peroxide and a peracid, the reactants being exposed to light during the reaction, and isolating the resultant 17,20-hydroxy-ketone from the reaction mixture.

4. A process for the preparation of a 17,20-hydroxy-ketone of the pregnane series, which comprises reacting a 3,11-diketo-pregnene having the grouping =CH—CH$_2$X in the 17-position, X representing a member selected from the group consisting of free, esterified and etherified hydroxyl, with osmium tetroxide and with a member selected from the group consisting of hydrogen peroxide, an alkyl peroxide and a peracid, the reactants being exposed to light during the reaction, and isolating the resultant 17,20-hydroxy-ketone from the reaction mixture.

5. A process for the preparation of a 17,20-hydroxy-ketone of the pregnane series, which comprises reacting a $\Delta^{4,17}$-3-keto-21-acetoxy-pregnadiene with osmium tetroxide and with a member selected from the group consisting of hydrogen peroxide, an alkyl peroxide and a peracid, the reactants being exposed to light during the reaction, and isolating the resultant 17,20-hydroxy-ketone from the reaction mixture.

KARL MIESCHER.
JULIUS SCHMIDLIN.

References Cited in the file of this patent
UNITED STATES PATENTS

| Number | Name | Date |
|---|---|---|
| 2,225,756 | Pincussen | Dec. 24, 1940 |
| 2,275,790 | Miescher | Mar. 10, 1942 |
| 2,341,288 | Pruckner | Feb. 8, 1944 |
| 2,437,564 | Serino | Mar. 9, 1948 |
| 2,492,194 | Sarett | Dec. 27, 1949 |
| 2,543,817 | Weil | Mar. 6, 1951 |